UNITED STATES PATENT OFFICE.

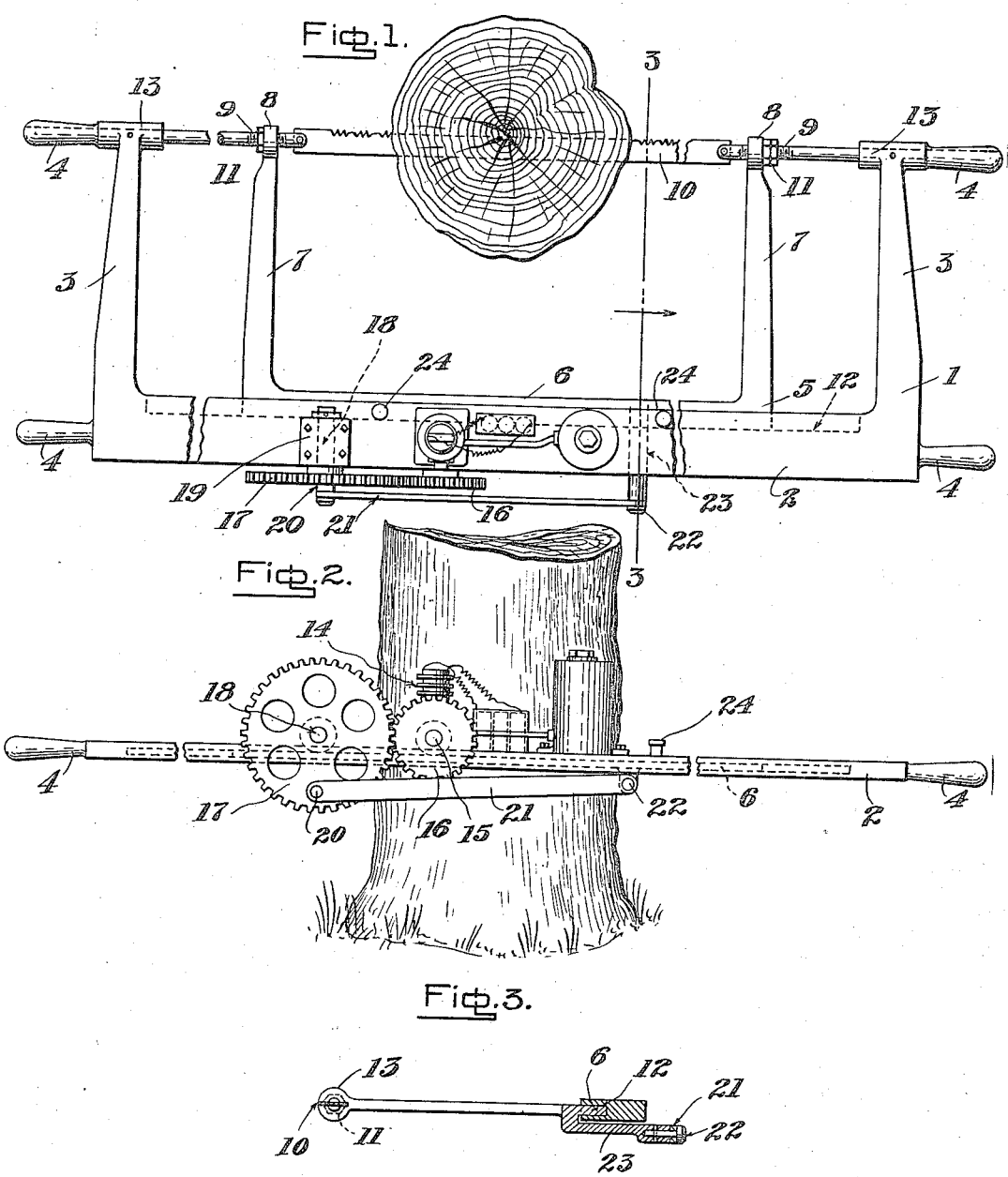

KARL T. WHITNEY, OF FAIRHAVEN, MASSACHUSETTS, ASSIGNOR OF ONE-THIRD TO CHARLES C. PARSONS, OF BROOKLINE, MASSACHUSETTS, AND ONE-THIRD TO FRANK F. KEZER, OF ROCHESTER, VERMONT.

SAWING-MACHINE.

1,124,244.	Specification of Letters Patent.	Patented Jan. 5, 1915.

Application filed May 2, 1911. Serial No. 624,584.

*To all whom it may concern:*

Be it known that I, KARL T. WHITNEY, a citizen of the United States, residing at Fairhaven, in the county of Bristol and State of Massachusetts, have invented certain new and useful Improvements in Sawing-Machines; and I do hereby declare the following to be a full, clear, and exact description of the invention, such as will enable others skilled in the art to which it appertains to make and use the same.

My invention relates to tree felling sawing machines and more particularly to a portable machine adapted to be supported and manipulated by the operators.

As is well known to those skilled in this art the felling of trees in a forest is a proceeding that requires much skill and care on the part of the woodsmen, and in order that the tree attacked may be caused to fall in a particular direction or in that direction desired by the woodsmen, it is necessary to attack the tree at a particular point in its circumference and the location of this point of attack is dictated by the center of gravity of the standing tree. The felling of trees in a forest is now commonly done by the use of an ax in the hands of a skilled woodsman, who after he has sized up the tree and determined the natural line of fall by its inclination with reference to a perpendicular line, or the weight of its outstanding branches, decides at what point in its circumference it should be chopped in order that it may fall in a certain and desired direction. In an attempt to secure a more expeditious method of felling trees than has heretofore been used, it has been proposed to use power driven saws mounted upon frames arranged to be transported to the tree, and supported in close proximity thereto so that the saw working in a substantially horizontal plane will saw through the trunk. But such devices as heretofore constructed have embodied as a part of their organization means whereby they are supported upon and rolled over the ground, and are fixed in position adjacent to the tree to be attacked. It has been found in practice however, that any apparatus of this kind which depends upon a ground support is of little or no practical value, for obviously the inequalities in the surface of the ground and the close proximity of other trees to the one which is to be felled, limit and hamper the free adjustment of the apparatus, so that it has been practically impossible to locate and position the driving saw to cut at the desired point, either with relation to the circumference of the tree or the height at which it is desired to attack.

The object of my invention therefore is to produce a tree felling power driven sawing machine which in every sense of the word shall be portable, and which while in operation shall be supported entirely free and clear of all contact with the ground surface, and positioned at any desired angular position with relation to the trunk of the tree which it is desired to fell, and at any point on said trunk at any distance above the ground; in short to produce a portable apparatus embodying a power driven saw which shall at all times be capable of being positioned with relation to the tree trunk as the judgment and skill of the woodsmen shall dictate.

To the above ends my invention consists of a portable tree felling sawing machine supported and freely movable by the operators, and it further consists of the devices and combinations of devices which will be hereinafter described and claimed.

My invention is shown in the accompanying drawing in which—

Figure 1 shows a top plan view of the apparatus illustrating its operation. Fig. 2 shows a side view and Fig. 3 shows a section on the line 3—3 in Fig. 1.

Similar reference characters will be used throughout the specification and drawing to designate corresponding parts.

As hereinbefore set forth my apparatus is intended to be supported by the operators and portable and freely movable in every sense of the word, entirely independent of any ground or other support.

To this end it comprises a main frame 1 consisting of a longitudinal plate or bar 2, having at either end the forwardly extending arms 3, the whole forming a substantially yoke-shaped frame. This frame may be made of any suitable material, preferably a light metallic casting, and the arms 3 are of a length to provide a suitable clearance for the tree trunk as the operation of sawing proceeds.

The main frame 1 will be provided with suitable handles or grips 4, there being two such handles at each end, and they are designed to be grasped and held by the operators, one at either end, for the purpose of supporting, transporting and manipulating the apparatus when in use.

Within the main frame 1 which may be properly defined as a stationary frame, is a sliding frame 5 which also comprises a back plate or bar 6, and the forwardly extending arms 7 located within and extending parallel to the arms 3 of the main frame 1.

The forward ends of the arms 7 carry suitable bearings 8 in which are mounted the threaded rods 9, to the inner ends of which is secured the saw blade 10 of any suitable or preferred construction, the rods 9 receiving the threaded nuts 11 whereby a suitable tension may be applied to the saw blade 10.

The movable frame 5 is arranged to slide freely or to reciprocate in the fixed or stationary frame 1, and for this purpose it is supported and guided in any suitable or convenient manner, or in the manner shown in the drawing, wherein the back plate or bar 2 of the frame 1 is provided upon its inner face with a longitudinally extending channel or groove 12 within which the rear edge of the back plate or bar 6 is fitted and freely movable, and the rods are received in and arranged to freely reciprocate in suitable bearings 13 carried by the forward ends of the arms 3 of the stationary frame 1, and preferably extending into the handles 4 at the forward end of said arms in order to provide a long bearing and a considerable stroke to the reciprocating movements of the frame 5.

From the foregoing description it will be understood that the frame 1 is held by the operators at each end, supporting the saw at any desired elevation from the ground and at any desired angular position with relation to the tree to be felled, and while so held the frame 5 will have imparted to it rapid reciprocations causing the saw blade 10 to cut into the trunk of the tree.

Any suitable means may be provided for reciprocating the frame 5 but preferably I provide a power operated mechanism which comprises a suitable explosive engine 14 and its various attachments mounted upon the stationary frame 1, the shaft 15 of which carries a tooth gear 16 which meshes with a tooth gear 17 mounted upon the shaft 18, held to revolve in a suitable box or bearing 19 supported upon the upper surface of the frame 1.

The gear 17 carries a crank pin 20 to which is pivoted at one end a link 21, the opposite end of said link being pivotally connected at 22 to an arm 23 extending rearwardly from the frame 5 and beneath the back plate 2 of the frame 1, as clearly shown in Fig. 3 of the drawing.

If desired suitable lubricating cups 24 may be provided to lubricate the sliding bearing connection of the movable frame 5 with the fixed frame 1.

In operation, the engine being started, a reciprocating motion will be imparted to the frame 5 through the gears 16 and 17 and the link 21, and thus the saw when held in contact with the trunk of the tree will cut its way through the tree.

It is well known to those skilled in this art that before making the severing cut in the trunk of the tree to be felled, the trunk is notched on the side opposite to that at which the felling cut is made, and this notch has heretofore been made by the use of an ax, but because of the readily portable feature of my apparatus, and the fact that it may be presented to the tree at any desired angle, this notch may be readily formed by the use of my apparatus, and thereafter by moving it around the tree to the other side a severing cut may be made, and during the operation of the apparatus in making the severing or felling cut, it can be constantly shifted and moved about as the circumstances may require to secure the best results.

Having described my invention I claim as new and desire to protect by Letters Patent of the United States:

In a sawing machine for felling trees a portable horizontal frame adapted to be held stationary with respect to the tree to be felled a pair of long arms extending from one side of said frame in a horizontal direction, a support at each end of said frame, a support on each of said long arms and forming guides for a saw in axial alinement therewith, a saw supporting frame consisting of a back plate provided with arms for reciprocating said saw, and means on said portable frame in alinement with the supports thereon and connected to said back plate for reciprocating the latter.

In testimony whereof I affix my signature, in presence of two witnesses.

KARL T. WHITNEY.

Witnesses:
H. M. CHAMBERLAIN,
T. HART ANDERSON.